June 17, 1947.  C. A. MEYER ET AL  2,422,214
FUEL INJECTOR MOUNTING FOR COMBUSTION CHAMBERS
Filed Aug. 17, 1944
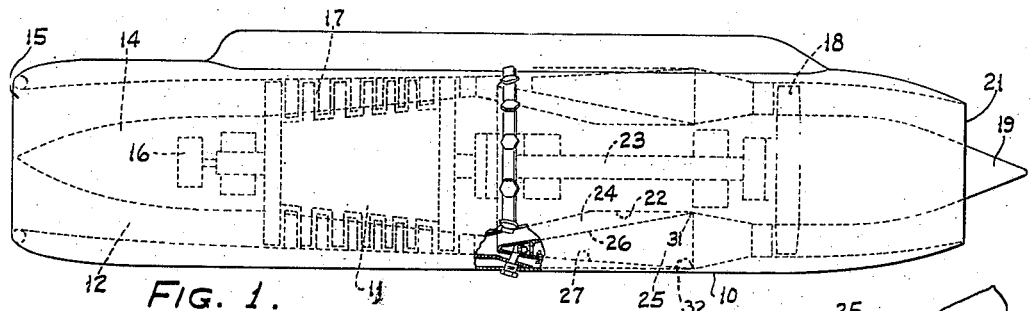
FIG. 1.
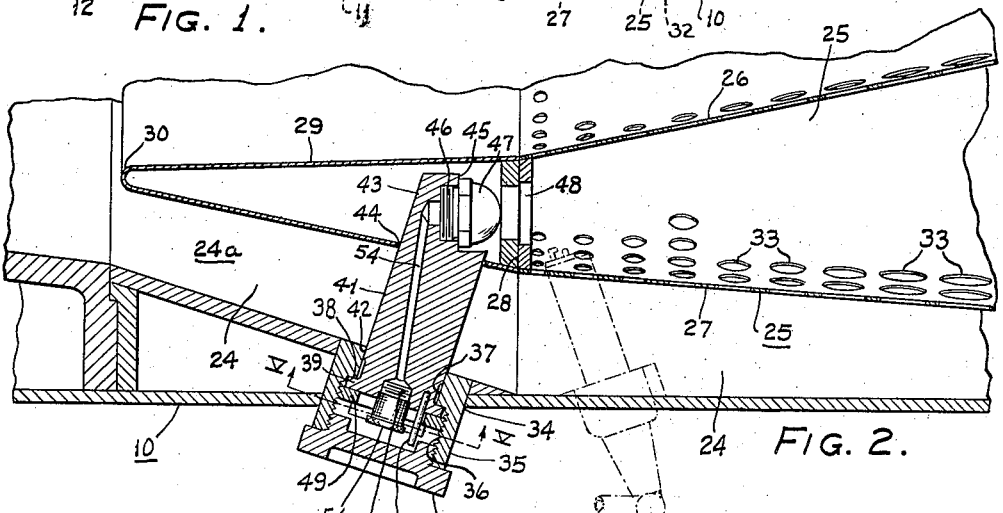
FIG. 2.
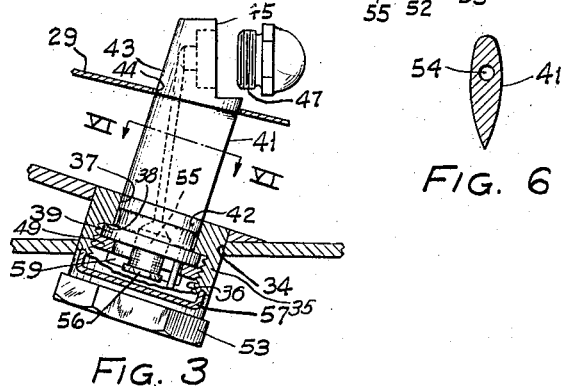
FIG. 3
FIG. 6
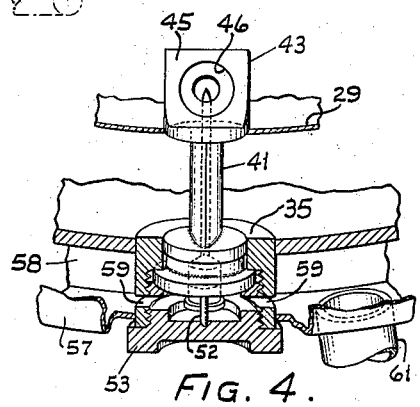
FIG. 4.
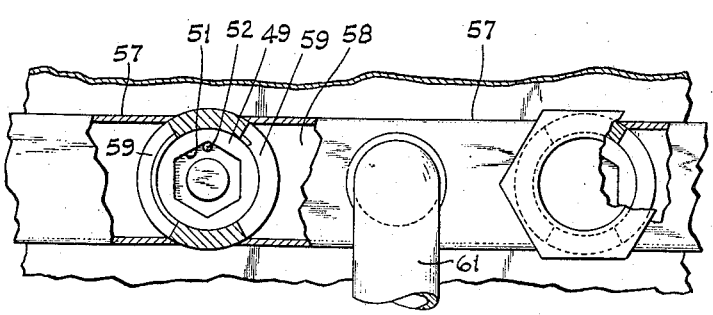
FIG. 5.
INVENTORS
CHARLES A. MEYER,
ARNOLD H. REDDING.
BY
ATTORNEY Patented June 17, 1947

2,422,214

UNITED STATES PATENT OFFICE 2,422,214

FUEL INJECTOR MOUNTING FOR COMBUSTION CHAMBERS

Charles A. Meyer, Drexel Hill, and Arnold H. Redding, Swarthmore, Pa., assignors to Westinghouse Electric Corporation, East Pittsburgh, Pa., a corporation of Pennsylvania Application August 17, 1944, Serial No. 549,934

3 Claims. (Cl. 60—44)

This invention relates to power plants and particularly to the manner of mounting fuel nozzles in a gas turbine power plant and it has for an object to provide an improved device of the character set forth.

The present invention, while not limited thereto, is particularly adapted to be used in a gas turbine power plant like that disclosed in the patent to Stewart Way, No. 2,405,723, issued August 13, 1946, and assigned to the assignee of the present invention. A plant of the type disclosed in the mentioned Way patent includes an air compressor, air heating apparatus, a gas turbine, and a propulsion jet nozzle, all housed within a streamlined tubular casing. A plant of this character, although not limited thereto, is particularly suitable for propelling aircraft at high speeds and operates generally as follows: Air enters the forward end of the tubular casing, which is pointed in the direction of flight, is compressed in the compressor, and the compressed air is then heated in the heating apparatus by combustion of fuel supported by the compressed air. The resulting motive fluid, comprising the products of combustion and excess compressed air, drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by means of a pump which is preferably driven by the turbine.

In a plant of this character, fuel, such as gasoline, is atomized by means of fuel nozzles in a combustion chamber or chambers where it is thoroughly mixed with compressed air supplied to the chamber and burns continuously after it has ignited by suitable means such as spark plugs mounted in the combustion chamber.

The present invention is particularly concerned with the location of and manner of mounting the fuel nozzles. In accordance with the present invention, the nozzles are readily removable for inspection, cleaning and replacement and are arranged so that the fuel issuing as a jet spray from the nozzles travels substantially axially of the combustion chambers and at an angle to jets of compressed air entering the combustion chamber to provide an immediate and thorough mixing of the fuel with the air so that continuous and even burning of the air-fuel mixture is obtained.

It is a further object of the invention to provide an improved fuel nozzle and manner of mounting the same in a combustion apparatus to permit ready removal and replacement of the nozzle.

These and other objects are effected by the invention as will be apparent from the following description and claims taken in connection with the accompanying drawings, forming a part of this application, in which:

Fig. 1 is a side elevational view of a gas turbine power plant in which the present invention is incorporated, a portion of the outer casing structure being broken away to show certain details of construction;

Fig. 2 is a fragmentary sectional view, shown on an enlarged scale, of the combustion apparatus and one of the fuel nozzles of the plant shown in Fig. 1;

Fig. 3 is a side, elevational view of one of the fuel nozzles with portions of the adjacent plant structure being shown in section and with the nozzle tip shown removed from its supporting strut;

Fig. 4 is a view similar to Fig. 3 taken on a plane displaced 90° from that on which Fig. 3 has been taken;

Fig. 5 is a fragmentary plan view of the outer casing taken in the region of the fuel nozzle assemblies with portions broken away to illustrate certain details of construction, the broken away portion at the left of the figure corresponding to a section taken on the line V—V of Fig. 2; and Fig. 6 is a sectional view taken substantially on the line VI—VI of Fig. 3.

The power plant shown in Fig. 1 comprises in general an outer casing structure 10 open from end to end and a central core structure 11 providing an axial flow passage 12 through the casing. The plant is adapted to be mounted in the wings or fuselage of an aircraft with the flow passage 12 extending fore and aft with respect thereto and with the left end, as viewed in Fig. 1, pointing in the direction of flight.

The central core structure 11 is supported by the casing structure 10 along its longitudinal axis and includes a hollow fairing cone 14 defining with the forward or left end, as viewed in Fig. 1, of the casing 10, an air inlet 15 of the flow passage 12. The fairing cone 14 houses a fuel pump, generally indicated 16, and other auxiliary apparatus (not shown) driven by the turbine. The core structure 11 also includes an axial flow compressor 17, a gas turbine 18 and an axially movable tailpiece 19 which defines with the rear end of the casing structure 10, an adjustable propulsion nozzle 21.

The intermediate portion of the core structure 11 between the compressor 17 and the turbine 18 comprises an inner wall or casing structure 22 which houses a shaft 23 connecting the rotor of turbine 18 and the rotor of compressor 17. This inner casing or wall structure 22 defines, with the outer casing structure 10, an annular space 24, including a diffusing portion 24a adjacent the compressor outlet, which connects the compressor blade passage with the turbine blade passage and houses the air heating or combustion apparatus.

The annular space 24 is provided with a suitable combustion chamber 25, such as shown in the copending application of Way et al., Serial No. 511,468, filed November 23, 1943 and assigned to the assignee of the present invention, for heating the air compressed by the compressor.

In the embodiment illustrated, the combustion chamber 25 comprises an inner perforated cone 26 and an outer perforated cone 27 tapering in the opposite directions and secured together at their upstream ends by an annular ring structure 28. This ring structure 28 also carries an annular, conical section sheet metal member 29 having its rounded apex 30 extending upstream. The member 29 serves to split or divide the stream of air discharging from the compressor so that the air enters the combustion chamber through the perforated inner and outer walls 26 and 27, respectively. The downstream ends 31 and 32 of the cones 26 and 27, respectively, are secured in any suitable manner to the inner wall structure 22 and the outer casing 10, respectively, for supporting the combustion chamber in the annular space 24.

The walls of the inner and outer cones are perforated, having circumferentially-spaced, axially-extending rows of holes 33. The holes 33 are of progressively increasing size in the downstream direction and serve to admit the compressed air into the combustion chamber.

In the mentioned copending application of Way et al., a plurality of fuel atomizing nozzles are mounted in the closed upstream end of the combustion chamber and direct the fuel axially of the combustion chamber. However, considerable dismantling of the plant is necessary to remove the nozzles or render the latter accessible for cleaning or repair. It is a feature of the present invention to mount the fuel atomizing nozzles so that they direct the fuel into the combustion chamber in substantially the same manner as the mentioned Way et al. application but are, nevertheless, readily removable for cleaning or inspection and in a very simple and inexpensive manner.

To this end, the outer casing 10 is provided with a circumferential row of large openings 34 corresponding in number to the number of fuel nozzles. Each of these openings 34 has a ferrule 35 permanently secured to the casing structure 10. Each ferrule is counterbored to provide for an outer internally-threaded portion 36, an inner portion 37 of reduced diameter, and an outwardly-facing shoulder 38.

The shoulder 38 provides a seat for the outer flanged end 39 of a nozzle-tip carrying body member 41. If desired, a suitable sealing gasket may be provided between the flange 39 and the shoulder 38. The body member 41 has, near its outer end, a cylindrical portion 42, adjacent the flange 39 of a diameter to be removably received in the ferrule bore portion 37, and a cylindrical portion 43 at its inner end which is adapted to extend through an opening 44 in the conical member 29. The portion of the body 41 between the cylindrical inner and outer ends and which lies in the annular air space 24 is of streamline section, as shown in Fig. 6, to minimize its resistance to air flow in the space 24.

The inner cylindrical end 43 of the body 41 is cut away or notched to provide a flat surface 45 substantially normal to the axis of the combustion chamber. This surface is provided with a threaded recess or bore 46 in which an atomizing nozzle tip 47 of any preferred construction is removably threaded. The ring structure 28 of the combustion chamber is provided with an opening 48 opposite each nozzle tip through which the fuel spray from the nozzle passes for mixing with the air entering the combustion chamber through the openings 33.

The body member 41 is removably secured in place by means of a nut 49 engaging the threaded portion 36 of the ferrule 35. The nut 49 is provided with a noncircular tool-receiving opening 51 (Fig. 5) and is locked in place by means of a removable pin 52 carried by the outer end of the body member 41. The outer end of the ferrule 35 is closed by a cover 53 having threaded engagement with the internally-threaded portion 36 of the ferrule.

The fuel to be atomized is supplied to the nozzle tip 47 through a passage 54 drilled through the body member, the passage communicating at its inner end with the interior of the nozzle tip and opening at its outer end into an enlarged threaded recess 55. As the body member extends in a direction having a very large component radially of the plant, the cylindrical bore 46 for the nozzle tip has its axis disposed at an angle to its communicating passage 54 to provide for desired direction of the fuel spray through the associated ingress opening 48 for the combustion chamber. The recess 55 is adapted to receive a cylindrical strainer 56 for ready replacement and cleaning.

The ferrules are connected by means of arcuate sheet metal channel members 57 which form with the outer surface of the casing, connecting passages 58 between adjacent ferrules. Each ferrule 35 has opposed slots 59 placing its interior in communication with adjacent passages 58 so that the passages 58, slots 59 and the hollow interiors of the ferrules provide a manifold for distributing the fuel to the nozzle tips.

Fuel is supplied from the pump 16 to said manifold structure by means of a pipe 61 (Fig. 5).

From the structure described above, it will be seen that when it is desired to replace or clean a nozzle tip, it is merely necessary to remove the cover 53, the pin 52 and nut 49, after which the body member and tip assembly may be readily withdrawn. As the group of openings for each nozzle, and including the outer casing opening 34, the splitter opening 44 and the ingress opening 48, are centered in a common axial plane of the outer casing 10, the openings 34 and 44 being aligned and the opening 48 being positioned to receive the full spray discharging from its nozzle tip 47, it will be apparent that the body member and nozzle tip assembly may be moved inwardly through the aligned openings to position the nozzle tip in correct relation with respect to the ingress opening. Also as the axis of the aligned openings 34 and 44 extends inwardly with an axial component of direction which is downstream of the plant, the nozzle tip is moved axially and radially in relation to the plant with the result that it may be brought to centered position with respect to the ingress opening and quite close to or within the space between boundary faces of the ring structure, the axial component of direction assuring that the tip shall clear the ring structure as it passes over the latter. To clean any particular filter 56, it is merely necessary to remove the associated cover 53.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a gas turbine power plant comprising an outer casing, an inner casing cooperating with the outer casing to provide an annular flow passage, a structure including perforated wall elements defining a divergent combustion chamber of annular section within said flow passage and with the apical portion of said chamber extending upstream of the passage, said outer casing and said structure each having one or more openings therein and the opening or openings of said structure being at the apical portion of the combustion chamber, each opening of the outer casing and a corresponding opening of said structure constituting a pair of openings centered in a common axial plane of the outer casing, a fuel nozzle for each pair of openings and having an atomizing portion at one end, said nozzle being constructed and arranged to move relatively to the opening of said structure and through the opening of said outer casing incident to removal thereof and attachment thereof to the outer casing, and means for detachably connecting the outer casing structure and each fuel nozzle so that the latter may extend through the outer casing opening for discharge of an atomized spray of fuel through the opening of said structure into the apical portion of the combustion chamber, the axis of each outer casing opening extending inwardly toward the associated opening of the structure with a component of direction which is axial and downstream with respect to the plant.

2. In a gas turbine power plant comprising an outer casing; an inner casing cooperating with the outer casing to provide an annular flow passage; a structure including inner and outer perforated wall elements, a ring joining the wall elements so that the latter define a combustion chamber of annular section within said flow passage, said combustion chamber diverging away from said ring with the ring end portion thereof extending upstream of said passage, and an annular splitter carried by said ring and extending upstream of said passage, said splitter including inner and outer divergent walls joined by a rounded apical portion; said outer casing, said ring, and the outer wall of said splitter each having one or more openings therein; each opening of the outer casing and corresponding openings of the outer wall of said splitter and of said ring constituting a group of openings centered in a common axial plane of the outer casing; a fuel nozzle for each group of openings and having an atomizer portion at one end; said fuel nozzle being constructed and arranged to move relatively to the opening of said ring and through the openings of the splitter outer wall and of the outer casing incident to removal thereof and attachment thereof to the outer casing; and means for detachably connecting the outer casing and each fuel nozzle so that the latter may extend through the outer casing opening and through the outer wall of the splitter with its atomizing inner end positioned for discharge of an atomized spray of fuel through the opening of said ring into the small end of the combustion chamber.

3. In a power plant having an outer casing of circular section bounding an air passage, structure defining a combustion chamber and provided with a plurality of openings for the ingress of fuel sprayed into the combustion chamber, said structure being disposed inwardly of the casing and spaced from the latter by the air passage, and apparatus providing fuel sprays for the respective ingress openings; said apparatus comprising a nozzle construction for each opening and each nozzle construction including a ferrule, an elongated body member, and a nozzle tip connected to the latter to provide a body member and nozzle tip assembly; said ferrules being arranged as a circumferential series connected to and extending through the casing wall and each ferrule having its bore counterbored to provide inner and outer bore portions of smaller and larger diameter joined by an outwardly-facing shoulder; said body members extending through the bore portions of smaller diameter and inwardly through the air passage toward the respective fuel spray ingress openings and having flanges at their outer ends in abutment relation with respect to the shoulders; said flanges having threaded connections with respect to the ferrules and being located in the bore portions thereof of larger diameter; covers detachably connected to the outer ends of the ferrules and cooperating with the bore portions thereof of larger diameter to provide fuel chambers; duct means arranged externally of the casing and connecting the fuel chambers circumferentially so that such chambers constitute portions of a common manifold space; each body member having a passage and a cylindrical bore formed therein with the bore located at the inner end of the body member; said passages extending lengthwise of the body members and connecting the associated fuel chambers with the cylindrical bores thereof and each bore being arranged at an angle to the passage with which it communicates so that it may be disposed substantially in coaxial relation with the associated ingress opening; said nozzle tips being located in the cylindrical bores and having threaded connections with respect to the body members; and said cover portions of the ferrules providing, when detached, for access to the body members to provide for insertion and removal of the body member and nozzle tip assemblies by movement of the latter through the ferrule bore portions of smaller diameter.

CHARLES A. MEYER.
ARNOLD H. REDDING.

REFERENCES CITED

The following references are of record in the file of this patent:

UNITED STATES PATENTS

| Number | Name | Date |
| --- | --- | --- |
| 2,085,761 | Lysholm | July 6, 1937 |
| 2,326,072 | Seippel | Aug. 3, 1943 |
| 1,301,201 | Abrahamson | Apr. 22, 1919 |
| 1,833,748 | Hellstrom | Nov. 24, 1931 |
| 1,448,745 | Hobart et al. | Mar. 20, 1923 |
| 2,096,814 | Laessker | Oct. 26, 1937 |

FOREIGN PATENTS

| Number | Country | Date |
| --- | --- | --- |
| 542,528 | France | May 18, 1922 |
| 288,600 | Great Britain | Apr. 11, 1929 |

Certificate of Correction

Patent No. 2,422,214.　　　　　　　　　　　　　　　　　　　　　　　　June 17, 1947.

CHARLES A. MEYER ET AL.

It is hereby certified that error appears in the printed specification of the above numbered patent requiring correction as follows: Column 6, line 66, for the patent number "1,301,201" read *1,301,211*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*